United States Patent [19]

Figler

[11] 4,401,981

[45] Aug. 30, 1983

[54] SYSTEM FOR READING MULTIPLEXED DATA

[75] Inventor: Alan A. Figler, Algonquin, Ill.

[73] Assignee: Baxter Travenol Laboratories, Inc., Deerfield, Ill.

[21] Appl. No.: 325,547

[22] Filed: Nov. 27, 1981

[51] Int. Cl.³ .............................................. G09G 3/00
[52] U.S. Cl. .................................... 340/715; 340/805; 364/466; 364/478; 364/567
[58] Field of Search ................ 340/715, 805; 364/567, 364/568, 466, 468, 478, 479

[56] References Cited

U.S. PATENT DOCUMENTS

| 3,872,461 | 3/1975 | Jarosik et al. | 340/715 |
| 4,055,753 | 10/1977 | Rogers et al. | 340/715 |
| 4,251,769 | 2/1981 | Ewert | 340/715 |

Primary Examiner—Marshall M. Curtis
Attorney, Agent, or Firm—Robert A. Benziger; George H. Gerstman; Paul C. Flattery

[57] ABSTRACT

Dynamically changing time-multiplexed numbers are presented by reading data one digit at a time, storing the digits, repeating the reading sequence at least twice and comparing the stored digits from each reading sequence against the stored digits from the previous reading sequence. If two consecutive reading sequences are not identical, the reading sequence is repeated at least twice again.

7 Claims, 4 Drawing Figures

FIG. 1

| TIME | DIGIT | | | | READING |
|---|---|---|---|---|---|
| | THOUSAND | HUNDRED | TENS | UNIT | |
| $t_0$ | 0 | 0 | 9 | 9 | 9 |
| $t_1$ | 0 | 0 | 9 | 9 | 9 |
| $t_2$ | 0 | 1 | 0 | 0 | 1 |
| $t_3$ | 0 | 1 | 0 | 0 | 0 |
| | | | | | 0199 |

FIG. 4

| POSITION BITS | | | | DIGIT | | | | NUMBER | | | |
|---|---|---|---|---|---|---|---|---|---|---|---|
| 0 | 0 | 0 | 1 | 0 | 0 | 1 | 0 | | | | 2 |
| 0 | 0 | 1 | 0 | 0 | 0 | 1 | 1 | | | 3 | 0 |
| 0 | 1 | 0 | 0 | 0 | 1 | 1 | 0 | | 5 | 0 | 0 |
| 1 | 0 | 0 | 0 | 1 | 0 | 0 | 1 | 9 | 0 | 0 | 0 |
| 0 | 0 | 1 | 0 | 0 | 0 | 0 | 1 | | | 1 | 0 |
| 0 | 0 | 0 | 1 | 0 | 1 | 0 | 1 | | | | 5 |

SYSTEM FOR READING MULTIPLEXED DATA

TECHNICAL FIELD

The present invention concerns a system for presenting numbers accurately which are dynamically changing, and, more particularly, a system for reading and presenting time-multiplexed numbers.

BACKGROUND ART Although the illustrative embodiment concerns the presentation of accurate weight information with respect to a container that is being loaded or unloaded and thus its weight is dynamically changing, it is to be understood that the system of the present invention is applicable to the reading and presentation of other dynamically changing numbers.

In the reading and presentation of changing numbers, such as in reading and presenting the weight of a container being loaded or unloaded, certain problems arise when microprocessor-based systems are utilized. For example, if the analog weight information is converted to binary boded decimal (BCD) digits, the BCD digits are typically read one at a time. However, the analog data such as the weight information may be constantly changing during normal operation, such as during loading or unloading of a container. Thus during a "read" cycle, the digits might change.

An illustration of this problem may be found in FIG. 1. FIG. 1 illustrates a system that is being read between time $t_0$ to time $t_3$. During times $t_0$ and $t_1$, the weight is 99 grams. Sometimes between $t_1$ and $t_2$, the weight has changed to 100 grams. Thus from time $t_2$ to time $t_3$, the weight is 100 grams.

The problem occurs because the multiplexed data is read one digit at a time. Thus at time $t_0$, the unit digit 9 is read, at time $t_1$, the 10's digit 9 is read, at time $t_2$ the hundred digit 1 is read, and at time $t_3$ the thousand digit 0 is read. This results in an apparent reading of 0199 which is inaccurate because the correct reading should be 99 at $t_0$ to $t_1$ and 100 at $t_2$ to $t_3$.

A possible solution to this problem is the addition of hardware the latch the data so that the $t_0$ reading remains until the end of $t_3$. However, the addition of such hardware or circuitry to provide the necessary latch is relatively expensive.

Therefore, it is an object of the present invention to provide a system for reading changing data accurately without requiring latching hardware.

Other objects and advantages of the present invention will become apparent as the description proceeds.

SUMMARY OF THE INVENTION

In accordance with the present invention, a method is provided for presenting dynamically changing time-multiplexed numbers. The method comprises the steps of providing a reading sequence by (a) reading a first series of bits to obtain a first digit; and (b) thereafter reading a second series of bits to obtain a second digit. The two digits obtained are stored and the reading sequence is repeated at least twice. The two digits from each reading sequence are compared against the two digits from the previous reading sequence. If two consecutive reading sequences are not identical, then the reading sequence is repeated again. On the other hand, if two consecutive reading sequences are identical, then an output representing the multi digit number is provided.

In the illustrative embodiment, the time-multiplexed number is a four digit number. After reading the second series of bits to obtain the second digit, thereafter a third series of bits is read to obtain a third digit and thereafter a fourth series of bits is read to obtain a fourth digit. The storing step comprises the step of storing the four digits that are obtained.

In the illustrative embodiment, the number of total reading sequence repeats is limited if two consecutive reading sequences are not identical. To this end, a counter is initialized to the maximum number of counts desired. The counter is varied in response to each repeated reading sequence and an error signal is provided if the counter reaches the maximum value.

In further accordance with the present invention, a system is provided for presenting dynamically changing time-multiplexed numbers. The system includes means for providing an analog signal representative of a number to be presented. The analog signal is converted to binary coded digits and the binary coded digits are multiplexed. Means are provided for reading a first series of bits to obtain a first of the binary coded digits and thereafter reading a second series of bits to obtain a second digit of the binary coded digits. Means are provided for storing the two digits obtained and for repeating the reading sequence at least twice. Means are provided for continuing to repeat the reading sequence twice over and over until at least two consecutive reading sequences are identical.

A more detailed explanation of the invention is provided in the following description and claims, and is illustrated in the accompanying drawings.

BRIEF DESCRIPTION OF THE DRAWINGS

FIG. 1 is a chart showing how multiplexed data can be read inaccurately;

FIG. 4 is a chart showing the interpretation of numbers by binary coded digits.

DETAILED DESCRIPTION OF THE ILLUSTRATIVE EMBODIMENT

Figure 2:
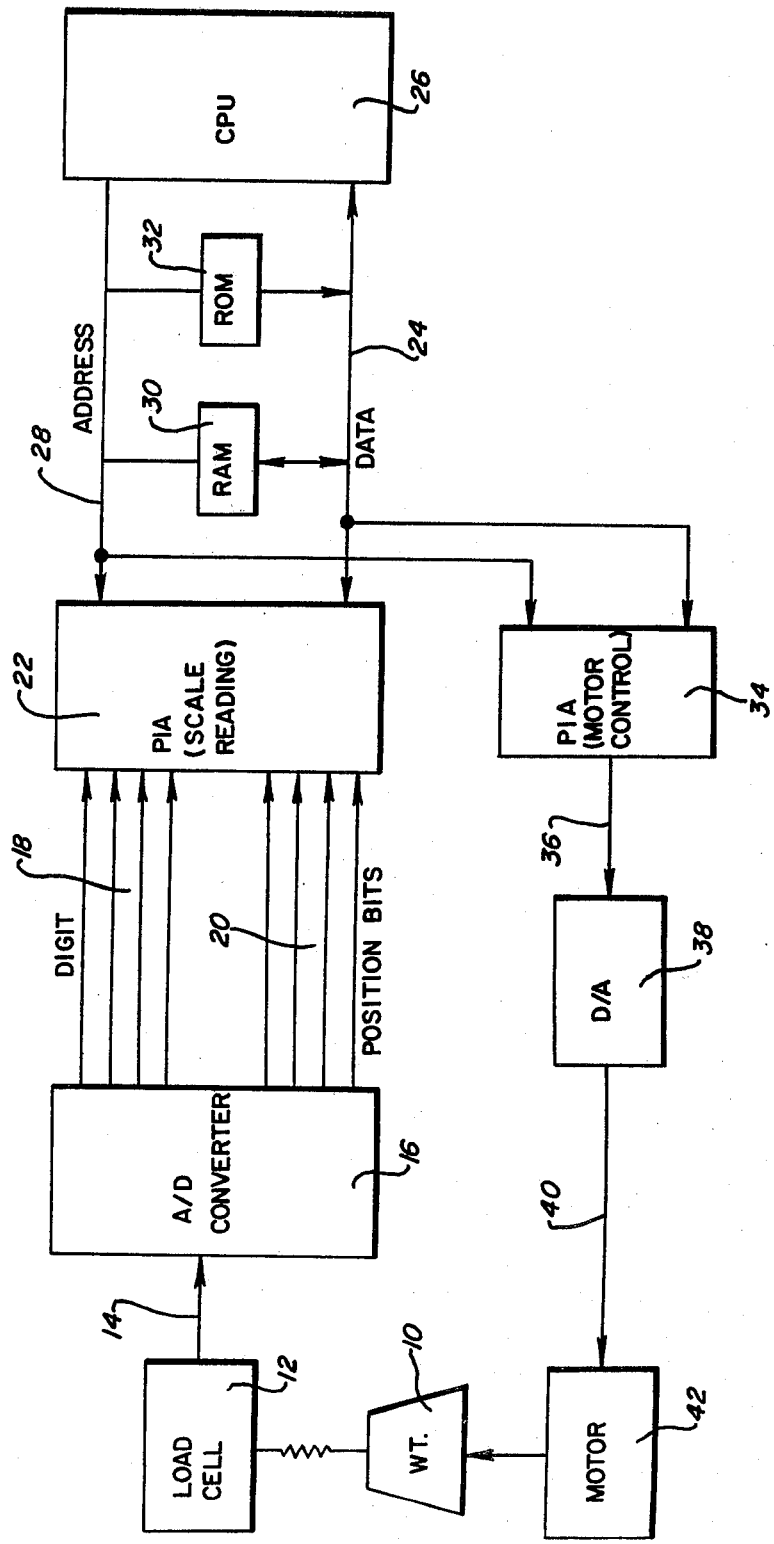
FIG. 2 is a schematic block diagram of a system for presenting dynamically changing time-multiplexed numbers, in accordance with the principles of the present invention.

Referring to FIG. 2, a device 10 having a constantly changing parameter, such as the dynamically changing weight of a container 10 being filled or emptied, is illustrated therein coupled to a load cell 12 for sensing the weight of container 10. The analog output of load cell 12 is fed via line 14 to an analog to digital converter 16. Analog to digital converter 16 has output digit lines 18 and output position lines 20. Digit lines 18 provide BCD digits from 0 to 9 while position lines 20 provide BCD digits from 0 to 9 to indicate the position of the digit. To understand this more clearly, refer to FIG. 4. If the analog number from line 14 is 2, the BCD data on digit lines 18 will be 0010 and the BCD data on position lines 20 will be 0001. Thus with respect to the position bits, a 1 in the unit's place will indicate that the number from lines 18 should be in the unit's place. Likewise, if the position lines data is 0010 (with the 1 in the ten'place) this will indicate that the number on digit lines 18 should be in the ten's place. Likewise, if the 1 in the position lines 20 is in the hundred's place, this will indicate that the number on digit lines 18 should be in the hundred's place and if the 1 in the position lines 20 is in the thousand's place, this will indicate that the number on digit lines 18 should be in the thousand's place. FIG. 4 shows the resulting number from six different examples.

Digit lines 18 and position lines 20 are fed to a peripheral interface adapter (PIA) 22 which is coupled by data line 24 to a microprocessor 26. Microprocessor 26 addresses the peripheral interface adapted via address line 28. Data line 24 is eight lines wide so that it may provide an eight bit wide number in parallel. This eight bit wide number consists of the position and a digit.

The analog to digital converter 16 is constantly cycling to present constantly new digits and position information, but it is only read when microprocessor 26 issues the command to PIA 22 to read it.

Coupled between address bus 28 and data bus 24 is a RAM 30 and a ROM 32, with the RAM containing the digit information and the ROM containing the system program. Also coupled between address bus 28 and data bus 24 is a motor control PIA 34 which feeds a digital signal via line 36 to a digital to analog converter 38. The output line 40 of digital to analog converter 38 operates a motor 42 for increasing or decreasing the weight of container 10 such as by pumping a fluid into or out of the container.

Figure 3:
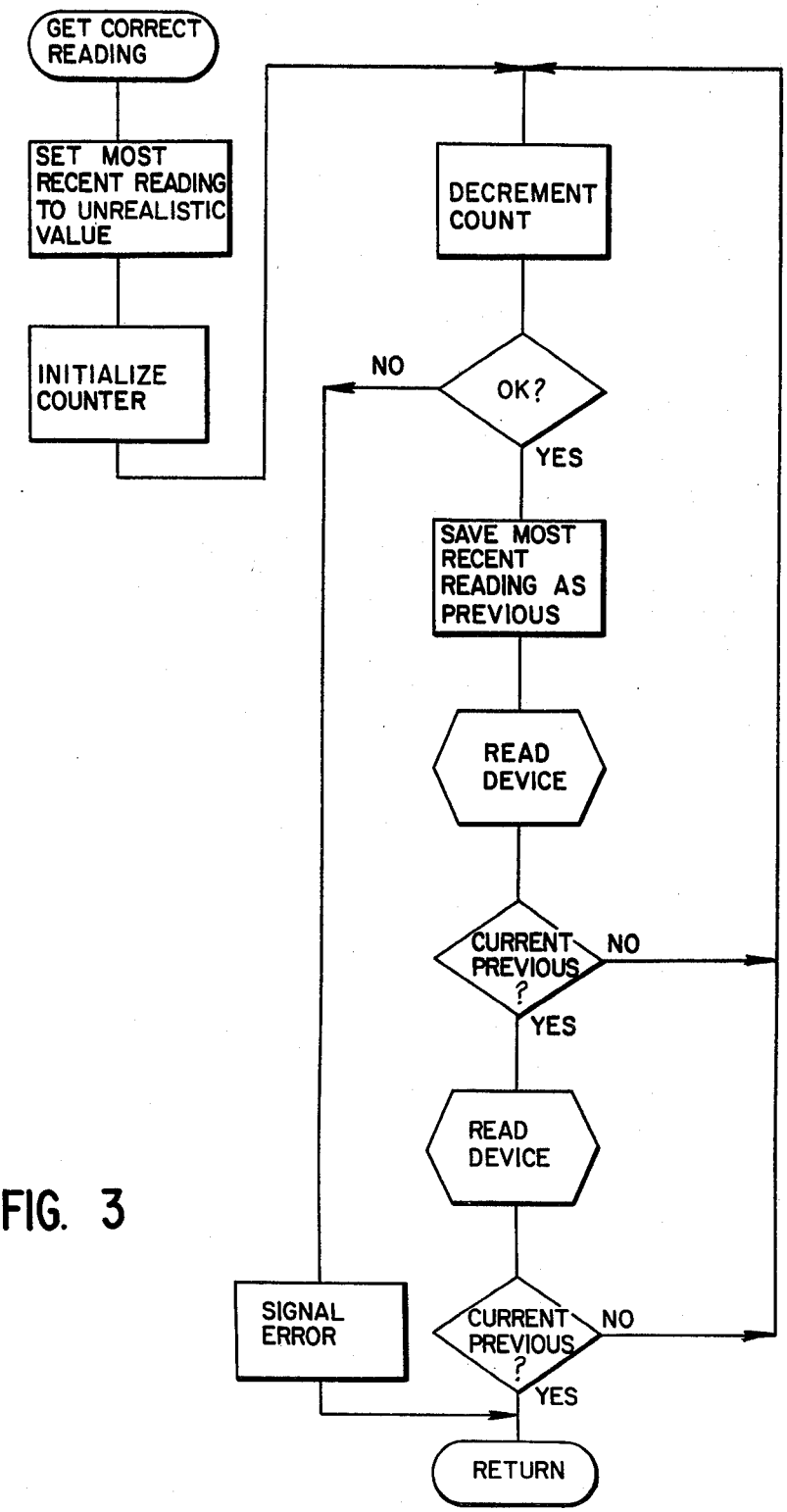
FIG. 3 is a flow diagram of the system of FIG. 2.

The operation of the system can be understood by referring to the flow diagram of FIG. 3. The basic purpose is to get a correct reading, notwithstanding the dynamically changing time-multiplexed weight information. First, a selected, unrealistic weight value such as minus one (−1) is stored in RAM 30. A counter is initialized so as to input a maximum number of cycling attempts whereas if after this number of cycling attempts fails, the system is shown to have an error. For example, if it is desired to cycle the system a maximum of 255 times, the hexidecimal number FF (255) is stored and the counter will count down no further than that number before showing that there is an error.

To begin the loop, the counter is decremented one count. So long as the counter has not decremented to zero, it passes to the next command which is to save the most recent reading. In other words, the four bit digits which comprise the weight information in BCD are stored. PIA 22 is now instructed to read the actual weight. It will first read the thousand digit position, then the hundred digit position, then the ten digit position and then the unit digit position. If the current weight is equal to the previous weight, it will continue to take another reading. On the other hand, if the current weight does not match the previous weight, it will recycle and count down again. If the current weight is equal to the previous weight on the second reading, it will read the device again and if the current weight is equal to the previous weight on the third reading it will return to show a correct reading. It should be noted that on the first reading the current weight will never be equal to the previous weight because the current weight has been set to an unrealstic value. After the reading sequence has been repeated and a predetermined number of consecutive reading sequences are identical, the multi digit number has then been determined accurately and the microprocessor can present an output in any suitable form desired.

It can be seen that a plurality of readings is taken and at least two consecutive equalized readings are required in order to consider it to be a correct reading. If there are less than two consecutive equalized readings, an error signal is provided and the system recycles. However, there is a predetermined number of recycles that the system should take until it is considered a total error.

Although an illustrative embodiment of the invention has been shown and described, it is to be understood that various modifications and substitutions may be made by those skilled in the art without departing from the novel spirit and scope of the present invention.

That which is claimed is:

1. A method of presenting dynamically changing time-multiplexed numbers which comprises the steps of:
   providing a reading sequence by (a) reading a first series of bits to obtain a first digit; and (b) thereafter reading a second series of bits to obtain a second digit;
   storing the two digits obtained;
   repeating the reading sequence at least twice;
   comparing the two digits from each reading sequence against the two digits from the previous reading sequence;
   if two consecutive reading sequences are not identical, then continuing to repeat the reading sequence; and
   if two consecutive reading sequences are identical, then providing an output representing a multi-digit number.

2. A method of presenting dynamically changing time-multiplexed numbers which comprises the steps of:
   providing a reading sequence by (a) reading a first series of bits to obtain a first digit; (b) thereafter reading a second series of bits to obtain a second digit; (c) thereafter reading a third series of bits to obtain a third digit; and (d) thereafter reading a fourth series of bits to obtain a fourth digit;
   storing the four digits obtained;
   repeating the reading sequence at least three times;
   comparing the four digits from each reading sequence against the four digits from the previous reading sequence;
   if three consecutive reading sequences are not identical, then continuing to repeat the reading sequence; and
   if three consecutive reading sequences are identical then providing an output representing a multi-digit number.

3. A method as described in claim 1, wherein said reading sequence is repeated three times.

4. A method as described in claim 1, including the step of limiting the number of total reading sequence repeats if two consecutive reading sequences are not identical.

5. A method as described in claim 4, in which said limiting step comprises the steps of initializing a counter to the maximum number of counts desired and varying the counter in response to each repeated reading sequence, and providing an error signal if the counter reaches the maximum value.

6. A system for presenting dynamically changing time-multiplexed numbers, which comprises:
   means for providing an analog signal representative of a number to be presented;
   means for converting the analog signal to binary coded digits;
   means for multiplexing said binary coded digits;
   means for reading a first series of bits to obtain a first of said binary coded digits, and thereafter reading a second series of bits to obtain a second digit of said binary coded digits;

means for storing the two digits obtained;

means for repeating the reading sequence at least twice;

means for continuing to repeat the reading sequence twice over and over until at least two consecutive reading sequences are identical; and means for limiting the number of total repeated reading sequences.

7. A system as described in claim 6, wherein said reading means further includes means for thereafter reading a third series of bits to obtain a third digit of said binary coded digits, and thereafter reading a fourth series of bits to obtain a fourth binary coded digit; and said storing means includes means for storing the four digits obtained.

* * * * *